Nov. 29, 1960     K. B. CLARK ET AL     2,961,762
SOLID PHASE STRIP INLAY BONDING
Filed March 6, 1957
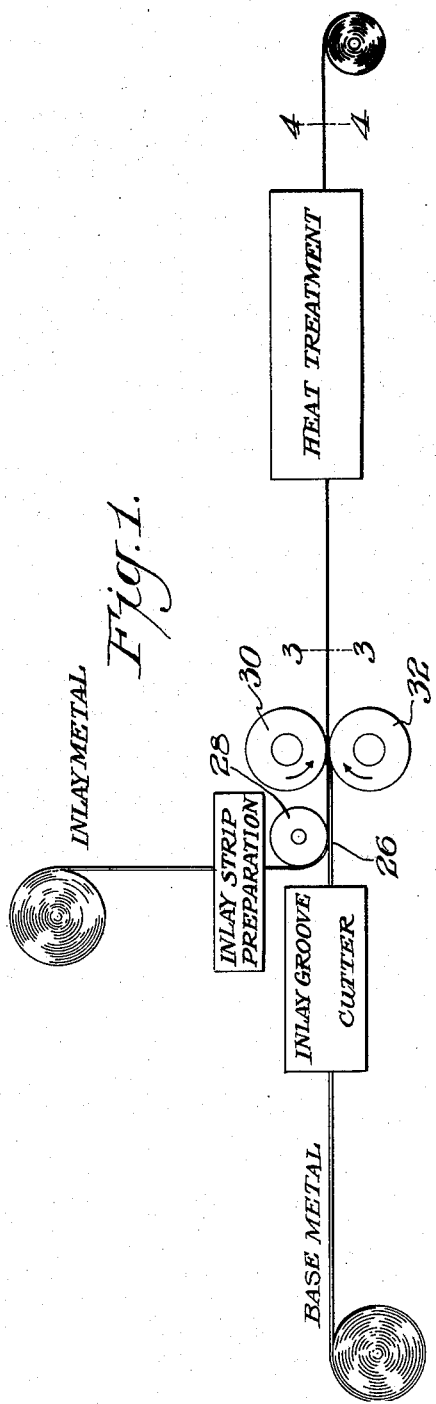
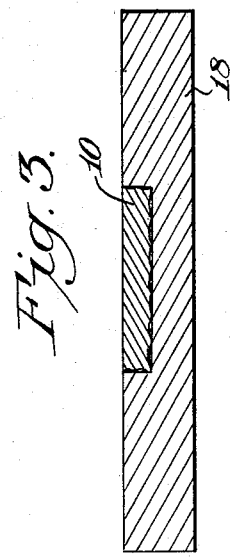
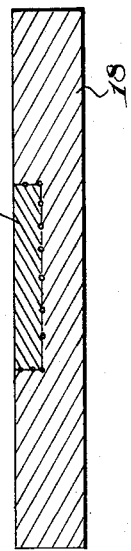
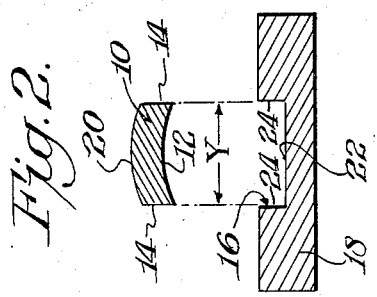
INVENTORS.
KENNETH B. CLARK
& GEORGE DURST
BY
Connolly and Hutz
THEIR ATTORNEYS ated Nov. 29, 1960

United States Patent Office 2,961,762
Patented Nov. 29, 1960

2,961,762

SOLID PHASE STRIP INLAY BONDING

Kenneth B. Clark, Esmond, R.I., and George Durst, Attleboro, Mass., assignors to Texas Instruments Incorporated, Dallas, Tex., a corporation of Delaware Filed Mar. 6, 1957, Ser. No. 644,297

8 Claims. (Cl. 29—475)

This invention relates to the solid phase bonding of metals, i.e. the joining of solid metals without adding or otherwise producing a liquid phase between the metals. More particularly, the present invention relates to an improved method, using solid phase bonding, for producing strip inlay composite materials.

In accordance with this invention, pairs of dissimilar metals, such as tantalum and brass, pure iron and titanium, copper and stainless steel, nickel and molybdenum, gold and tin bronzes, silver and brass, silver and copper, etc., may be inlaid, one within the other, providing the metals are of such physical characteristics, including malleability as to permit deformation as required by the process thereof. The term "metal," as used in the specification and claims hereof, includes both metals in the pure or elementary state and metal alloys.

Metal strip inlays, often referred to as strip material, are used for a number of purposes ranging from, for example, inlaying for the purpose of decoration to inlaying electrical contact metal, such as silver, into a base conductor, such as copper. For such uses, particularly in the electrical conductor field, it is essential, not only from the electrical but also from the mechanical standpoint, that the metals be firmly united along all contacting surfaces.

There are many ways, of course, of making strip material and one commonly used in the art includes milling a groove in one surface of a thick ingot of a given width, inserting a silver bar of the same cross-sectional shape as the groove and soldering the silver bar in position in the groove. Soldering is conventionally accomplished by the use of sheet solder along the edges or walls of the groove and along the bottom. After soldering, the composite ingot is rolled, in successive stages, to reduce its thickness to the desired amount. This method depends upon human skill to prevent variation in rolling conditions from pass to pass. Since, in many cases, the rolls are crowned slightly, variation in lateral position from pass to pass may result in different reductions per pass. Precision guiding through the rolls from pass to pass is, fo course, difficult. As a result, the finished product suffers from a partial loss of parallelism between the inlay strip and the edges of the stock. Because of this condition, control of accurate slitting to give proper width and dimensions of strip edge distance from the edge of the base metal is difficult and costly because of the necessity of scrapping certain portions of the length of the finished product. The acceptable finished product is generally cut to short lengths for the purpose of providing electrical contacts.

In U.S. Patents 2,691,815 and 2,753,623, there are described and claimed different processes for solid phase bonding of metals. However, in the case of a groove whose transverse cross-sectional shape is substantially rectangular, sidewall metal bonding as obtained by the processes of those patents, although adequate for some purposes, leaves something to be desired particularly in the case of producing electrical contact inlays as described above or other inlays requiring bonding strength at the sidewalls equal to bonding strength between the bottoms of the groove and the inlay strip. In theory, lower bonding strength at the sidewalls of grooves of rectangular cross-section, is explainable on the basis that there is no increase in area of the metals at the sidewalls, i.e., although elongation of the sidewall occurs, this is compensated for by a decrease in height of the sidewall which maintains the area of the sidewall constant. Without area increase, there will be no substantial attenuation of residual film that might otherwise hinder bonding. Furthermore, adequate sidewall pressure generally is not obtained in the expected manner of applying the process of said patents.

A principal object of the present invention is to provide improved methods, using solid phase bonding for producnig strip inlay composite materials.

Another object of the present invention is to provide an improved method as aforesaid wherein dimensional control of the final product is obtained.

A further object of the present invention is to provide a process as aforesaid wherein the edges of the strip inlay are maintained in parallelism with the base metal edges with a higher degree of accuracy than heretofore possible.

Still another object of the present invention is to provide a method as aforesaid wherein the bonding forces at the sidewalls of the groove and inlay are comparable to those obtainable by known methods of solid phase bonding at the bottoms of the groove and strip.

A further object of the present invention is to provide a method as aforesaid which may operate on a continuous basis to produce inlaid strips of various widths and thicknesses.

These and other objects of the present invention will become more apparent upon considering the description appearing hereinafter taken with the drawing wherein:

Figure 1 diagrammatically illustrates, in side elevation, apparatus suitable for the purposes of the present invention;

Figure 2 is a cross-sectional view of a preferred embodiment of groove and strip shape prior to insertion and bonding in accordance with the present invention;

Figure 3 is an enlarged cross-sectional view along 3—3 of Figure 1 of composite inlaid strip subsequent to thickness reduction and prior to a subsequent heat treatment; and Figure 4 is an enlarged cross-sectional view of the finished product of the present invention, i.e., after heat treatment.

In accordance with the process of the present invention, it has been unexpectedly found that the solid phase bonding processes of the aforesaid patents are both adaptable to strip inlay sidewall bonding of inlay metals in a substantially rectangular groove. This is made possible by employing an inlay strip of certain critical transverse cross-sectional shape and size, and by employing certain critical steps, and timing of these steps.

With reference to Figure 2 of the drawing, the metal strip inlay 10 thereof includes, in transverse cross-section, an arcuate bottom surface 12 and plane side surfaces 14. The arc length 12 of the bottom surface is greater than the width of the groove 16 of rectangular cross-section in the base metal 18. The projected arc or chord length Y is slightly less than the width of the groove 16. In addition, the transverse cross-sectional area of strip inlay 10 is at least equal to the transverse cross-sectional area of the groove 16. Preferably, and as shown, the arcuate bottom surface 12 is concave rather than convex. A preferred embodiment for use with a rectangular groove includes an inlay strip 10 having, in transverse cross-section, arcuate bottom and top surfaces 12 and 20 arranged in concavo-convex relation and substantially parallel side surfaces 14. Preferred arc lengths of the arcuate bottom surface 12 are those which are 1–5% greater than the width of the groove 16. The depth of the groove 16 is generally from about 60 to 90 percent of the thickness of the strip inlay 10, preferably from about 75 to 80 percent for most metal pairs.

The method employed for producing an inlay strip 10 of the above described transverse cross-section is not critical. In the case of relatively thin inlay strips, e.g., 0.05 inch or less, a convenient means of forming the arcuate bottom surface 12 involves a simple bending and forming operation. In the case of thicker strips it may be more convenient to extrude the metal in desired shape or machine the metal to desired shape.

The groove 16 of substantially rectangular cross-section may be formed by a single step of machining just prior to the bonding step later to be described, or may be initially formed by conventional extrusion, rolling, or machining operation to form a groove slightly smaller than the desired size, with the final size being obtained by a machining operation just prior to the said bonding step.

The reason for the machining operation immediately preceding the bonding step is to obtain a freshly machined very pure surface which has not been exposed to atmospheric contamination more than a very short time (that is, a time in which substantially no barrier films will be formed) before the said bonding step. By machining is meant any metal removing operation, preferably by a sharp cutting tool, which will expose the pure surfaces described above and which at the same time will not generate more than a minimum amount of heat. Cutting, as mentioned above, is the preferred method, but scratch brushing or sanding may be used under proper conditions.

The same precautions apply to the preparation of the mating surfaces of strip inlay 10, and it is preferable to machine at least the edges thereof.

From the foregoing it will be apparent that as in the case of the processes of the above referred-to patents, it is absolutely essential that the surfaces of the strip and groove which subsequently become interfacial surfaces, i.e., surfaces 12, 14, 22, and 24, be free of gross contaminants and films acting as a barrier to bonding. The nature of such gross contaminants and barrier films and methods for removing the same are completely described in the two aforesaid patents, the contents thereof being incorporated herein by reference. As set forth above, a preferred embodiment for removing gross contaminants and films acting as a barrier to bonding includes, in accordance with the present invention, machining surfaces 14 and brushing surface 12 of inlay strip 10 while simultaneously milling and broaching groove 16, the resulting inlay strip and grooved base metal being brought together as shown in Figure 1 of the drawings at a point 26 and assembled by the pressure of roll 28 immediately following these operations. Immediately after assembly, which places the bottom surfaces 12 and 22 of the groove 16 and strip 10 in juxtaposition, the composite is squeezed by rolls 30 and 32 to effect a reduction in thickness of at least 30%. This operation is described hereinafter in more detail. A subsequent heat treatment step, as also discussed more fully hereinafter, completes the bonding operation.

The reduction in thickness referred to above and occurring, for example, between rolls 30 and 32 flattens the strip inlay 10 and forces, with great pressure, the sidewalls 14 into contact with the walls 24 of the groove while forcing the arcuate surface 12 into contact with the bottom surface 22 of the groove 16. This occurs concurrently with elongation of both metals. The net effect of these pressures and elongations is to cause a multiplicity of discrete bonds to be formed at the interfacial surfaces, these being true metallic bonds. The sum of these bonds is, for most combinations of metals, less than a complete bond, i.e., these bonds can be destroyed without difficulty. For the purpose of forming these bonds, reductions of the order of at least 30% in thickness are necessary. In most instances the reduction need not be more than 70%, a preferred reduction for most combinations of metals being of the order of 60–65%.

During the squeezing resulting in reduction in thickness of the order of at least 30%, it is found that it is desirable to maintain constant rolling conditions as to temperature, lubrication and back tension in particular, that is tension between the point of inlay groove cutting and rolls 30 and 32 as shown in Figure 1. Variation in tension (particularly back tension) will cause non-uniform stretch of the metals and thereby may cause non-uniformity of the depth and width of the groove and of the overall dimension, and thus loss of dimensional control. Back tension may be made insignificant, if necessary, by preforming a major portion of the groove. In the case of cross-sectional groove arrangements which are less than 10–15% of the cross-sectional area of the base metal, back tension imposes no problem. Where the groove cross-sectional areas are proportionally larger, it is desirable to control back tension by means such as suggested above.

Patent 2,691,815, referred to above, relates to a "cold" bonding process in which the said discrete metallic bonds are caused to grow laterally into complete bonds. In accordance with the process of that patent, the disclosure thereof being incorporated herein by reference, after reduction in thickness, the composite metals are heated at a temperature from approximately the recrystallization temperature of the metal having the lowest recrystallization temperature to a point below one of those temperatures, whichever is the lowest, at which liquid phase material would form or at which a brittle intermetallic compound would form in appreciable amount. This heating is continued for such a length of time as to effect the completion of the solid phase bond. In accordance with the process of that patent, the temperature of strip entry into the squeezing step is below the recrystallization temperature of the metal having the lowest recrystallization temperature. The metallic bonding process of Patent 2,753,623, the disclosure of which is also incorporated herein by reference, involves the same heating operation after squeezing but at least one of the metals entering the squeezing operation is at a temperature lying within the range extending from its recrystallization temperature up to the hot-short temperature of the metal or the temperature at which interfacial liquid phase material or a brittle intermetallic compound would form in appreciable amount, whichever is the lower. The choice of heating operations, i.e., either the "cold" or "hot" bonding processes, is as explained respectively in said patents dependent upon the choice of metal combinations and other factors. These factors are equally governing in this application, although, in general, the "cold bonding process" is preferred.

As will be apparent from the foregoing, this invention possesses the advantages of being entirely susceptible to continuous operation while producing a product of greatly improved parallelism and geometrical uniformity. In addition, the process is of simplified nature and produces a product which is susceptible to automatic machine slitting in view of the highly accurate dimensional control of the product. Furthermore, in some instances, a hard-finished product may be obtained, in many combinations of metals, without rerolling. For example, silver on brass need not be heat-treated at a temperature which will soften the brass.

The following examples are for the purpose of illustrating the present invention and are not limiting to the scope thereof which is set forth in the claims.

*Example 1*

A fine silver strip of .060 inch thickness and having concavo-convex bottom and top surfaces of an arc radius of 0.750 inch and a chord length (Y) of 0.444 inch was brushed on its concavely curved bottom surface 12 and machined on its plane side surfaces 14 to remove gross contaminants and films acting as a barrier to bonding. Simultaneously a base metal alloy of 92% copper, 7% zinc and 1% tin (Scovil-20), the width being 2.032 inches and the thickness being 0.160 inch, was broached to obtain a groove of substantially rectangular cross-section having a depth of 0.047 inch and a width of .447 inch. The prepared strip was immediately inserted into the base metal and the composite reduced in thickness by rolling. The final thickness was 0.060 inch, i.e., a percent reduction of about 63%. The sidewall bond resulting from the foregoing treatment, as well as the bottom surface bond was easily broken apart. The composite was then subjected to an annealing operation at a temperature of 800° F. for a time of about 2 hours and in a Nitroneal atmosphere. As a result of these operations, the resulting product is not only of greatly improved parallelism and geometrical uniformity, but, in addition, possesses a bond strength at the side-walls substantially equal to the bond strength at the bottom walls.

*Examples II–V*

The following tabulated data illustrates the bonding of other base and inlay strip metals of different dimensions and under different conditions of rolling and heat treatment in accordance with the present invention, the numerical and alphabetical references referring to Fig. 2 of the drawings. The products of these examples were equally as satisfactory in bond strength, parallelism and geometrical uniformity as that of Example I.

bonds therebetween, the side surfaces of the strip inlay and the groove being firmly engaged as the reduction ensues, insuring that the bottom and side surfaces of the strip and groove in contact with one another are protected from reformation of any barrier films, and subsequently heating the squeezed metals at a temperature from approximately the recrystallization temperature of the metal having the lowest recrystallization temperature to a point below one of those temperatures, whichever is the lowest, at which liquid phase material would form, or at which a brittle intermetallic compound would form in appreciable amount, said heating being continued for such a length of time as to effect solid phase bonding of strip to base metal along the sides as well as the bottom of the groove.

2. The method of claim 1 wherein the temperatures of the metals at the time they enter the squeezing step are below the recrystallization temperature of the metal having the lowest recrystallization temperature.

3. A method for solid phase bonding a malleable metal strip inlay in a malleable base metal which comprises the steps of inserting said malleable metal strip inlay having in transverse cross-section a concave arcuate bottom surface and substantially plane side surfaces, into a groove of substantially rectangular cross-section in said malleable base metal, the arc length of the arcuate bottom surface being greater than the width of the groove and the chord length of the arcuate bottom surface being less than the width of the groove and the transverse cross-sectional area of the strip inlay being at least equal to the transverse cross-sectional area of the groove, the bottom and side surfaces of the inlay strip and the groove being free of gross contaminants and films acting as a barrier to

|  | Example II | Example III | Example IV | Example V |
|---|---|---|---|---|
| Strip Identity, Dimensions, and Pretreatment: |  |  |  |  |
| Thickness | .052″ | .020″ | .037″ | .050″. |
| Y-dimension | .610″ | .282″ | .442″ | .447″. |
| Arc Radius | .750″ | .500″ | .750″ | .750″. |
| Material | Fine Silver | Fine Silver | Copper | Silver-Cadmium.[1] |
| Pretreatment | Brushed 12 and Machined 14. | Brushed 12 and Machined 14. | Brushed 12 and 14 | Brushed 12 and 14. |
| Base Metal Identity, Dimensions, and Method or Groove Preparation: |  |  |  |  |
| Total Width | 1.750″ | 3.000″ | 2.312″ | 1.500″. |
| Total Thickness | .150″ | .100″ | .090″ | .150″. |
| Groove Width | .617″ | .284″ | .445″ | .459″. |
| Groove Depth | .039″ | .016″ | .030″ | .040″. |
| Pretreatment | Mildred and Broached | Broached | Milled | Milled. |
| Material | Sco-20 | 90-10 Comm. Bronze | 304-Stainless Steel | Monel. |
| Squeezing Operation: |  |  |  |  |
| Percent Reduction | 66% | 60% | 44% | 66%. |
| Thickness After Bonding | .050″ | .040″ | .050″ | .050″. |
| Heat Treatment Operation: |  |  |  |  |
| Temperature | 800° F | 800° F | 600° F | 1,400° F. |
| Atmosphere | Nitroneal | Nitroneal | Air | Air. |
| Time | 2 hrs | 2 hrs | Rolled to .030″, sintered in a vacuum furnace for one hour at 1,450° F., and finish-rolled to 0.027″. | 15 min. |

[1] 86.6% Ag-13.4% Cd.

What is claimed is:

1. A method for solid phase bonding a malleable metal strip inlay in a malleable base metal which comprises the steps of inserting said malleable metal strip inlay having in transverse cross-section an arcuate bottom surface and substantially plane side surfaces, into a groove of substantially rectangular cross-section in said malleable base metal, the arc length of the arcuate bottom surface being greater than the width of the groove and the chord length of the arcuate bottom surface being less than the width of the groove and the transverse cross-sectional area of the strip inlay being at least equal to the transverse cross-sectional area of the groove, the bottom and side surfaces of the inlay strip and the groove being free of gross contaminants and films acting as a barrier to bonding, squeezing the assembled strip and base metal to flatten the strip in the groove and effect a reduction in thickness of at least 30% and producing a plurality of discrete bonds therebetween, squeezing the assembled strip and base metal to flatten the strip in the groove and effect a reduction in thickness of at least 30% and producing a plurality of discrete bonds therebetween, the side surfaces of the strip inlay and the groove being firmly engaged as the reduction ensues, insuring that the bottom and side surfaces of the strip and groove in contact with one another are protected from reformation of any barrier films, and subsequently heating the squeezed metals at a temperature from approximately the recrystallization temperature of the metal having the lowest recrystallization temperature to a point below one of those temperatures, whichever is the lowest, at which liquid phase material would form, or at which a brittle intermetallic compound would form in appreciable amount, said heating being continued for such a length of time as to effect solid phase bonding of strip to base metal along the sides as well as the bottom of the groove.

4. The method of claim 3 wherein the temperatures of the metals at the time they enter the squeezing step are below the recrystallization temperature of the metal having the lowest recrystallization temperature.

5. A method for solid phase bonding a malleable metal strip inlay in a malleable base metal which comprises the steps of forming a groove of substantially rectangular cross-section in said malleable base metal, the sides and bottom of said groove being free of gross contaminants and films acting as a barrier to bonding, forming said malleable metal strip inlay having in transverse cross-section arcuate bottom and top surfaces arranged in concavo-convex relation and substantially plane side surfaces, the bottom and side surfaces being free of gross contaminants and films acting as a barrier to bonding, the arc lengths of the arcuate surfaces being greater than the width of the groove and the chord lengths of the arcuate surfaces being less than the width of the groove and the transverse cross-sectional area of the strip inlay being at least equal to the transverse cross-sectional area of the groove, inserting said strip in said groove with the bottom surfaces of the groove and strip in juxtaposition, squeezing the assembled strip and base metal to flatten the strip in the groove and effect a reduction in thickness of at least 30% and producing a plurality of discrete bonds therebetween, the side surfaces of the strip inlay and the groove being firmly engaged as the reduction ensues, insuring that the bottom and side surfaces of the strip and groove in contact with one another are protected from reformation of any barrier films, and subsequently heating the squeezed metals at a temperature from approximately the recrystallization temperature of the metal having the lowest recrystallization temperature to a point below one of those temperatures, whichever is the lowest, at which liquid phase material would form, or at which a brittle intermetallic compound would form in appreciable amount, said heating being continued for such a length of time as to effect solid phase bonding of strip to base metal along the sides as well as the bottom of the groove.

6. A method for solid phase bonding a malleable metal strip inlay in a malleable base metal which comprises the steps of continuously forming a groove of substantially rectangular cross-section in said malleable base metal, the sides and bottom of said groove being free of gross contaminants and films acting as a barrier to bonding, continuously forming said malleable metal strip inlay having in transverse cross-section arcuate bottom and top surfaces arranged in concavo-convex relation and substantially plane side surfaces, the bottom and side surfaces being free of gross contaminants and films acting as a barrier to bonding, the arc lengths of the arcuate surfaces being greater than the width of the groove and the chord lengths of the arcuate surfaces being less than the width of the groove and the transverse cross-sectional area of the strip inlay being at least equal to the transverse cross-sectional area of the groove, inserting said strip in said groove as the strip and base metal groove are formed with the bottom surfaces of the groove and strip in juxtaposition, squeezing the continuously assembled strip and base metal to flatten the strip in the groove and effect a reduction in thickness of at least 30% and producing a plurality of discrete bonds therebetween, the side surfaces of the strip inlay and the groove being firmly engaged as the reduction ensues, insuring that the bottom and side surfaces of the strip and groove in contact with one another are protected from reformation of any barrier films and subsequently heating the squeezed metals at a temperature from approximately the recrystallization temperature of the metal having the lowest recrystallization temperature to a point below one of those temperatures, whichever is the lowest, at which liquid phase material would form, or at which a brittle intermetallic compound would form in appreciable amount, said heating being continued for such a length of time as to effect solid phase bonding of strip to base metal along the sides as well as the bottom of the groove.

7. The method of claim 1 wherein the side surfaces of the strip inlay and groove are rendered free of said gross contaminants and films by machining these side surfaces immediately preceding the squeezing of the assembled strip and base.

8. A method for solid phase bonding a malleable metal strip inlay in a malleable base metal which comprises the steps of inserting said malleable metal strip inlay having in transverse cross-section an arcuate bottom surface and substantially plane side surfaces, into a groove of approximately rectangular cross-section in said malleable base metal, the arc length of the arcuate bottom surface being greater than the width of the groove and the chord length of the arcuate bottom surface being less than the width of the groove and the transverse cross-sectional area of the strip inlay being at least equal to the transverse cross-sectional area of the groove, the bottom and side surfaces of the inlay strip and the groove being free of gross contaminants and films acting as a barrier to bonding, squeezing the assembled strip and base metal with a pressure sufficient to flatten the strip in the groove to produce a plurality of discrete bonds therebetween; the side surfaces of the strip inlay and the groove being firmly engaged as the reduction ensues, insuring that the bottom and side surfaces of the strip and groove in contact with one another are protected from reformation of any barrier films and subsequently heating the squeezed metals at a temperature from approximately the recrystallization temperature of the metal having the lowest recrystallization temperature to a point below one of those temperatures, whichever is the lowest, at which liquid phase material would form, or at which a brittle intermetallic ompound would form in appreciable amount, said heating being continued for such a length of time as to effect solid phase bonding of strip to base metal along the sides as well as the bottom of the groove.

References Cited in the file of this patent

UNITED STATES PATENTS

| | | |
|---|---|---|
| 793,307 | Lachman | June 27, 1905 |
| 1,586,927 | Wilkinson et al. | June 1, 1926 |
| 1,905,653 | Schranz | Apr. 25, 1933 |
| 2,226,944 | Reeve | Dec. 31, 1940 |
| 2,416,400 | Mehl | Feb. 25, 1947 |
| 2,618,845 | Quarnstrom | Nov. 25, 1952 |
| 2,753,623 | Boessenkool et al. | July 10, 1956 |
| 2,782,498 | Mushovic et al. | Feb. 26, 1957 |